United States Patent
Rosel et al.

(10) Patent No.: US 7,893,937 B2
(45) Date of Patent: Feb. 22, 2011

(54) METHOD FOR CREATING A PARAMETRIC SURFACE SYMMETRIC WITH RESPECT TO A GIVEN SYMMETRY OPERATION

(75) Inventors: Sébastien Rosel, Gif-sur-Yvette (FR); Jean-Marc Chauvet, Meyreuil (FR); Christophe Dufaut, Marseilles (FR); Yannick Wargniez, Paris (FR)

(73) Assignee: Dassault Systemes, Suresnes, Cedex (FR)

( * ) Notice: Subject to any disclaimer, the term of this patent is extended or adjusted under 35 U.S.C. 154(b) by 857 days.

(21) Appl. No.: 11/780,822

(22) Filed: Jul. 20, 2007

(65) Prior Publication Data

US 2008/0084414 A1    Apr. 10, 2008

(30) Foreign Application Priority Data

Jul. 21, 2006    (EP)    .................................. 06291190

(51) Int. Cl.
*G06T 17/00*    (2006.01)

(52) U.S. Cl. ........................ 345/420; 345/419; 345/423; 345/427; 345/581; 345/582; 345/585; 345/586; 345/606; 345/443; 345/441

(58) Field of Classification Search ................. 345/419, 345/420, 421, 423, 428, 582, 606, 672, 647, 345/427, 581, 585, 586, 433–443
See application file for complete search history.

(56) References Cited

U.S. PATENT DOCUMENTS

| | | | |
|---|---|---|---|
| 4,797,842 A | 1/1989 | Nackman et al. | |
| 6,553,337 B1 * | 4/2003 | Lounsbery | 703/2 |
| 6,587,105 B1 * | 7/2003 | Stam | 345/423 |
| 6,639,592 B1 | 10/2003 | Dayanand et al. | |
| 7,417,635 B2 * | 8/2008 | Rockwood et al. | 345/419 |
| 7,423,641 B2 * | 9/2008 | Borac | 345/420 |
| 7,636,091 B2 * | 12/2009 | Rockwood et al. | 345/420 |
| 2004/0085311 A1 | 5/2004 | Lee et al. | |
| 2006/0017723 A1 | 1/2006 | Baran et al. | |
| 2008/0246767 A1 * | 10/2008 | Shen et al. | 345/423 |

(Continued)

FOREIGN PATENT DOCUMENTS

EP    1 881 457 A1    1/2008

(Continued)

OTHER PUBLICATIONS

Havemann et al. "A versatile 3D Model Representation for Cultural Reconstruction". Published 2001.*

(Continued)

*Primary Examiner*—Kimbinh T Nguyen
(74) *Attorney, Agent, or Firm*—Hamilton, Brook, Smith & Reynolds, P.C.

(57) ABSTRACT

The invention is directed to a method for creating a parametric surface symmetric with respect to a given symmetry operation (20). The invention method: (i) identifies a mesh pattern (15a); (ii) creates a base mesh (15s) from the mesh pattern, according to a symmetry operation; (iii) subdivides the base mesh, at a given order, into a subdivided mesh defining elementary faces; and (iv) forms the parametric surface (16s) according to said faces. The base mesh is symmetric with respect to the symmetry operation such as a reflection symmetry. The invention further concerns computer program product and systems implementing the method according to the invention.

20 Claims, 8 Drawing Sheets

U.S. PATENT DOCUMENTS

2009/0128556 A1* 5/2009 Fischer et al. .............. 345/420

FOREIGN PATENT DOCUMENTS

WO     WO 01/08102 A1     2/2001

OTHER PUBLICATIONS

Havemann et al. "Progressive Combined BReps-Multi-Resolution Meshes for Incremental Real-Time Shape Manipulation". Pub. 2003.*

Bolz et al. "Rapid Evaluation of Catmull-Clark Subdivision Surfaces", published 2002.*

Boier-Martin et al. "Differentiable Parameterization of Catmull-Clark Subdivision Surfaces". Published 2004.*

Cotrina-Navau, J., et al., "A Generic Approach to Free Form Surface Generation," Proceedings of the Seventh ACM Symposium on Solid Modeling and Applications, section 7.2:35-44 (2002).

* cited by examiner

METHOD FOR CREATING A PARAMETRIC SURFACE SYMMETRIC WITH RESPECT TO A GIVEN SYMMETRY OPERATION

RELATED APPLICATION

This application claims priority under 35 U.S.C. §119 or 365 to European Patent Application No. EP 06291190.4, filed Jul. 21, 2006.

The entire teachings of the above application are incorporated herein by reference.

FIELD OF THE INVENTION

The invention relates to the field of computer-aided design, and more specifically to computer-aided creation of parametric surfaces, in particular parametric surfaces symmetric with respect to a given symmetry operation.

BACKGROUND OF THE INVENTION

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assembly of parts.

Creation of 3D computer graphics involves various steps, including modeling and process steps (subdivision of base meshes, conversion into parametric surfaces, rendering . . . ).

A number of different modeling techniques can be used to create a model of an assembly. These techniques include solid modeling, wire-frame modeling, and surface modeling. Solid modeling techniques provide for topological 3D models, where the 3D model is a collection of interconnected edges and faces, for example. Geometrically, a 3D solid model is a collection of trimmed or delimited surfaces that defines a closed skin. The trimmed surfaces correspond to the topological faces bounded by the edges. The closed skin defines a bounded region of 3D space filled with the part's material. Wire-frame modeling techniques, on the other hand, can be used to represent a model as a collection of simple 3D lines whereas surface modeling can be used to represent a model as a collection of exterior surfaces. CAD systems may combine these, and other, modeling techniques, such as parametric modeling techniques. CAD systems thus provide a representation of modeled objects using edges or lines, in certain cases with faces. The modeled objects comprises a number of lines or edges; these may be represented in various manners, e.g. non-uniform rational B-splines (NURBS), Bezier curves or other algorithms describing a curve.

Regarding process steps, CAD programs generally make use of base meshes during the modeling of objects. Base meshes are networks of interconnected elementary polygons, such as triangles or quadrangles.

A base mesh is modified by the user during design to obtain the required model, and then is converted into a plurality of parametric surfaces such as NURBS or B-Splines.

Concerning the modeled products: modern consumer products are often characterized by smoothly flowing shapes, the complexity of which exceeds simple analytical surfaces, such as planes, boxes and cylinders. Such products are instead typically modeled using spline curves and surfaces or the like. When designing a product, smoothness of object surfaces is a main concern. Consequently, 3D modelers usually have an assortment of tools for creating smooth surfaces.

In the following, "curvature" will be used as a geometry term indicating the extent that a curve or surface deviates from perfect straightness or flatness. Curvature is usually measured as the inverse of a local osculating radius. Thus, a curve has a low curvature and a large radius when it is slightly bent only, and has a high curvature and a small radius if bent sharply. While curvature is constant for arcs, circles, or for surfaces based thereon; the curvature of more complex curves such as splines (and surfaces based thereon) continually changes along the length of the curve.

Furthermore, the term "continuity" will be used for describing offsets (or relationships) between points along a curve or on a surface and also between abutting curves or surfaces. Such relationships may fall into different levels of continuity, which are usually: C0, C1, and C2. C0 denotes position continuity only (as in the case of abutting curves/surfaces). Curves show in this case a kink at the C0 point. Similarly, surfaces have a sharp crease along the C0 seam. Abutting curves and surfaces touch one another, but they have no curvature similarities. C1 denotes a continuity level augmented with tangent continuity, and C2 adds the curvature continuity. Where curvatures on both sides of a point in a curve are equal, the curve is seamless.

It will actually here be made reference to G0, G1, and G2 "geometrical" continuities, which slightly differ on the mathematical point of view, as known in the art. For example, two joining curve segments have Gn continuity if $n^{th}$ order derivatives of respective curves have the "same direction" at the join (proportionality defined by some matrix is sufficient, equality is not required). As a result, Cn implies Gn while the reciprocal is not necessarily true.

Amongst the core techniques of surface modeling, one generally makes use of piecewise low-order algebraic surfaces or implicit patches. Patches are parametric elementary surfaces controlled via a grid of control points, whereby they can be deformed. An important issue in using patches is that patches must be adequately joined to ensure geometric continuity along the patch boundaries. Typically, the patch cells are recursively subdivided to make it possible to adapt the local curvature to a given continuity requirement.

In numerous applications (such as computer graphics), subdivision surfaces such as Catmull-Clark, are used to approximate a surface derived from a base mesh. In particular, Catmull-Clark subdivision surfaces are now a standard for smooth free-form surface modeling. Subdivision surfaces are used to create smooth surfaces out of arbitrary meshes, that is, with arbitrary topology. They are defined as the limit of an infinite refinement process. A key concept is refinement: by repeatedly refining an initial polygonal mesh, a sequence of meshes is generated that converges to a resulting subdivision surface. Each new subdivision step generates a new mesh that has more polygonal elements and is smoother. In particular, Catmull-Clark subdivision surfaces can be seen as a generalization of bi-cubic uniform B-splines. An important point is that the generated mesh will mainly consist of quadrilaterals, so that the expected valence (or coordination number) of an ordinary vertex is four.

In the field of CAD, subdivision surfaces are not commonly accepted as they are not parametric. Thus, CAD systems provide conversion algorithms to convert a subdivision surface into a parametric surface consisting of a set of surface patches, such as NURBS patches.

Nevertheless, the resulting parametric surfaces may give rise to an insufficient quality of continuity. Indeed, the surfaces created are not systematically everywhere curvature continuous.

This may in particular occur when trying to symmetrize an initial subdivision surface according to a symmetry operation, so as to obtain a final surface which is symmetric with respect to said operation, as will be exemplified later. Indeed, in such a case, existing solutions lead to surfaces which are not curvature continuous at junctions of the initial subdivision surface and its symmetrized counterpart.

Therefore, there is a need for a method of creating a parametric surface symmetric with respect to a given symmetry operation, which allows for achieving a given geometrical continuity G1 (for example G1 or G2) requirement.

SUMMARY OF THE INVENTION

The invention therefore proposes a method for creating a parametric surface symmetric with respect to a given symmetry operation, comprising steps of:
  identifying a mesh pattern;
  creating a base mesh from the mesh pattern, according to said symmetry operation, said base mesh being symmetric with respect to said symmetry operation;
  subdividing the base mesh, at a given order, into a subdivided mesh defining elementary faces; and
  forming the parametric surface according to said faces.

In other embodiments, the method according to the invention may comprise one or more of the following features:
  the mesh pattern has a plurality of vertices, and the step of creating further comprises: modifying a portion of the plurality of vertices of the mesh pattern, according to said symmetry operation; and obtaining the base mesh according to said symmetry operation and unmodified vertices of the mesh pattern, so as to form the base mesh;
  at the modifying step, vertices are discarded;
  at the modifying step, vertices are partly discarded and partly adjusted in position;
  said symmetry operation is a reflection symmetry with respect to a plane; and said plurality of vertices are connected by edges defining pattern faces, said plane intersecting some of the pattern faces;
  the unmodified vertices belong to pattern faces fully located on one side of the plane; and the discarded vertices belong to pattern faces fully located on the other side of the plane;
  the subdivided mesh has a plurality of vertices connected by edges defining faces and the method according to the invention further comprises, at the step of forming, a step of: converting faces of the subdivided mesh into respective elementary parametric surfaces, said elementary parametric surfaces forming the parametric surface;
  the parametric surface is formed so as to have a required geometrical continuity Gi;
  the base mesh is subdivided according to the Catmull-Clark subdivision rules;
  the method according to the invention further comprises a step of providing a graphical user interface adapted for displaying said mesh pattern, a representation of said symmetry operation and the parametric surface;
  said mesh pattern, representation of said symmetry operation and the parametric surface are displayed in 3D;
  the method according to the invention further comprises, before identifying said mesh pattern, a step of: receiving a user modification of the mesh pattern or the symmetry operation, wherein said steps of creating, subdividing and forming are real-time performed;

The invention also proposes a computer program product, comprising code means designed for implementing steps according to the method according to the invention; and a computer system, comprising means designed for implementing steps according to implementing steps according to said method.

Furthermore, to the best of the knowledge of the inventor, whilst suggesting some features and variations relevant to creation of parametric surfaces in general, the prior art has not disclosed some of the highly advantageous features of the present invention discussed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 8-9 illustrates mesh pattern symmetrization according to an embodiment of the invention;

DETAILED DESCRIPTION OF THE INVENTION

A description of example embodiments of the invention follows.

Before entering details of the invention, a number of concepts and drawbacks of the prior art discussed above shall be exemplified in reference to FIGS. 1-6.

Figure 1:
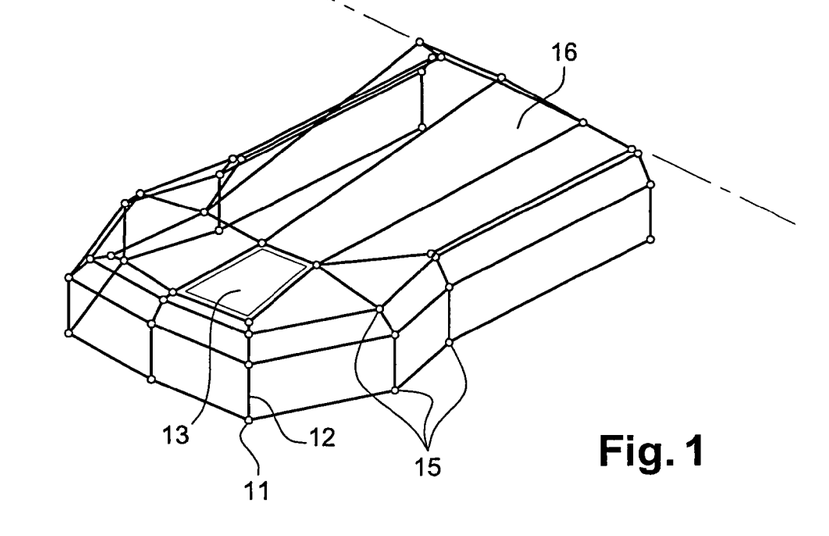
FIG. 1 shows a mesh and a corresponding subdivision surface.

An example of a mesh 15 and a resulting subdivision surface 16 is depicted in FIG. 1. The mesh comprises:
  vertices such as vertex 11 (a vertex is hence a point of the mesh),
  edges such as edge 12 (edges are lines connecting two vertices), and
  faces such as face 13, which are formed by loops of at least three or more edges.

In CAD, a lot of 3D objects are symmetrical along at least one direction, that is, symmetric with respect to an axis or a plane. It is accordingly necessary to provide functionalities in the CAD software which allows for management of symmetry.

The symmetry of an object is a characteristic feature thereof. Said object is symmetric with respect to a given operation if this operation, when applied to the object, does not change it. Subsystems a and b are symmetric to each other with respect to a given operation if, say, a is obtained from b by said operation and vice versa. For instance, starting from the initial object a, one may seek to obtain a final object ah, composed of each of a and b objects, using said symmetry operation. Thus, the design of the final object requires designing a only, which takes substantially less time for the user.

For instance, a usual symmetry operation used in the field is the reflection symmetry (also called mirror symmetry or mirror-image symmetry), which involves symmetry with respect to a reflection. Reflection symmetry is one of the most common types of symmetry. For example, in 2D: there is an axis of symmetry, while in 3D, there is a plane of symmetry. A transformed image of an object is then called mirror symmetric.

Obtaining the transformed object from the initial object (e.g. composed of points or vertices) is a well established mathematical process which may for instance involve transformation matrices.

In the following, it will be mainly referred to reflection symmetry in 3D, with respect to a plane. It should however be kept in mind that the invention may find application for various kind of transformations, such as reflection with respect to an axis of symmetry in 2D or 3D. Symmetry operators may further involve translation, rotation or rotoreflection.

Figure 2:
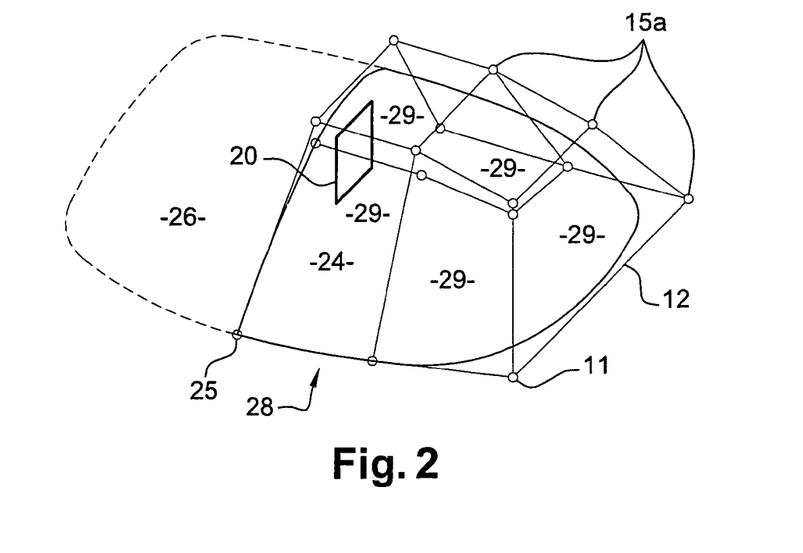
FIG. 2 provides an example of parametric surface of a half shape to be symmetrized according to a plane symmetry operation.

FIG. 2 gives an example of a parametric surface 24 (resulting from a subdivision). Inside the mesh 15a, patches or elementary parametric surfaces 29 are visible on the shape 24. The half shape 24 is the shape to be symmetrized according to a symmetry operation corresponding, in this example, to symmetry plane 20. Typically, a user performs the design of the half shape (e.g. the half shape 24 comprising all patches 29). Completing or modifying the design triggers a subdivision. Then, a symmetry operator is called in order to obtain the complementary surface 26, which is the symmetric of surface 24 with respect to plane 20. As discussed above, the creation of the half shape 24 using subdivision and then the use of symmetry will produce a shape 28 having discontinuities 25 at an intersection with the symmetry plane. Such discontinuities occur owing to intrinsic definition of subdivision technology.

Indeed, given that the shape 28 is defined by the mesh 15a, how vertices 111 of the mesh are positioned around the symmetry plane 20 is critical as to obtain a given geometrical continuity.

Figure 3:
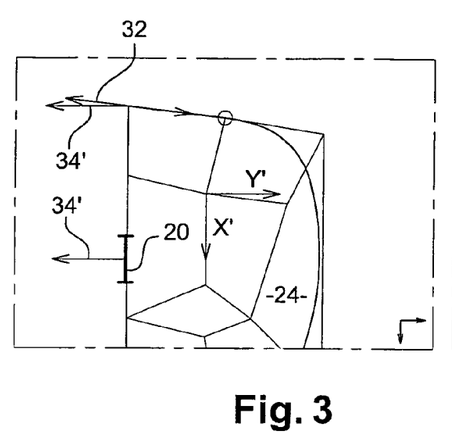
FIGS. 3-5 exemplify cases of parametric surfaces (before symmetrizing) which are likely to lead to curvature discontinuities.
Figure 4:
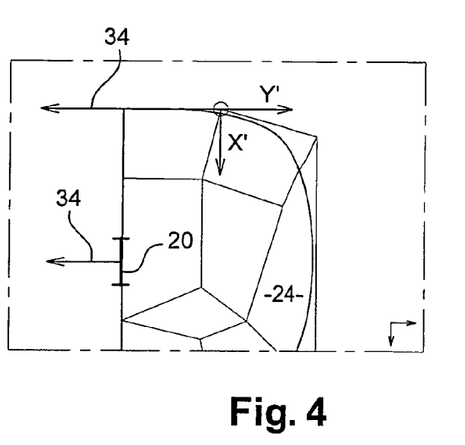

For example, consider FIGS. 3-4 wherein half shapes 24 of are represented (rotated with respect to axis y, compared with FIG. 2).

In some situations (FIG. 3), the arrangement of vertices lead to a tangency direction 32 at the end surface tangent to plane 20 which is not normal to said plane 20, that is, not collinear with normal vectors 34', whereby a discontinuity follows.

Yet, there are situations (see FIG. 4) where tangency continuity can be reached: in FIG. 4, the vertex positions are such that tangency direction 34 is normal to plane 20.

Figure 5:
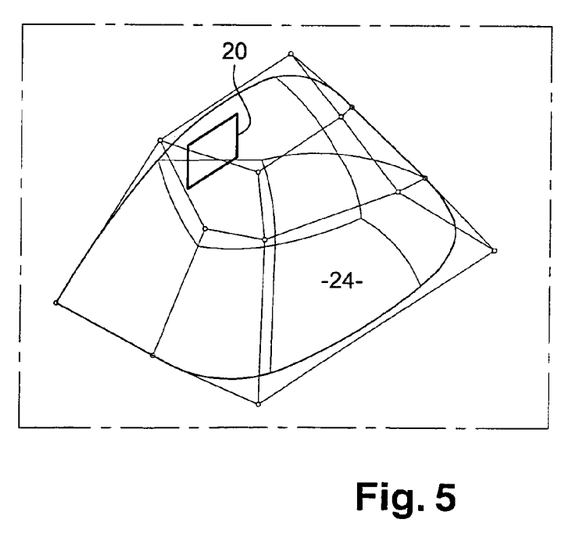

However, it is not possible to reach full tangency continuity in all cases, depending on the mesh complexity. For example, FIG. 5 shows an example of a mesh 15a, which, although quite simple in appearance, does not allow for achieving tangency continuity.

Figure 6:
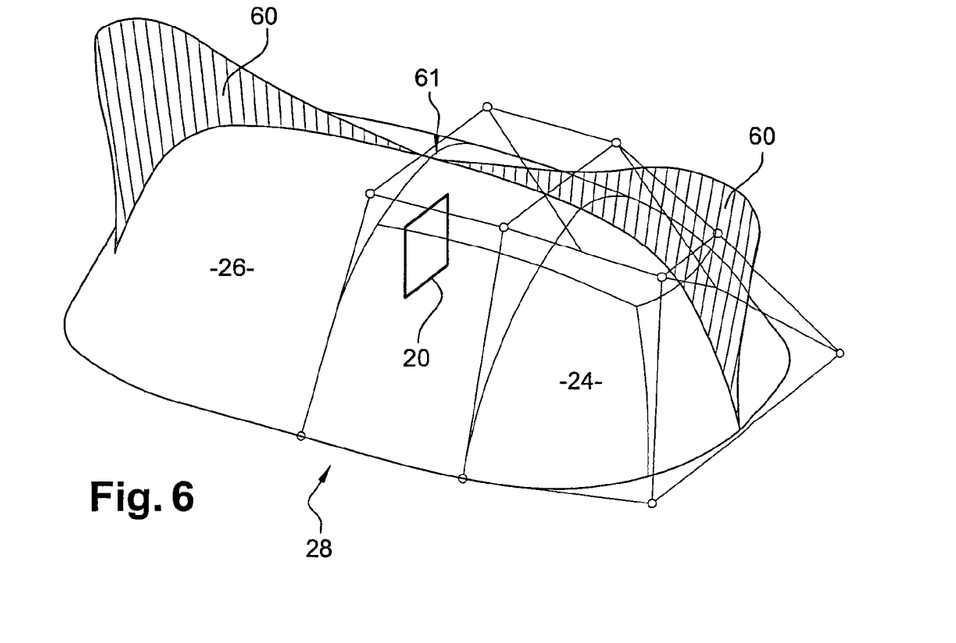
FIG. 6 exemplifies a curvature discontinuity occurring after symmetrization of a subdivision surface.

Accordingly, the creation of half a shape using subdivision produces at the best tangency continuity shapes 28 but curvature continuity cannot be reached. As illustrated in FIG. 6, this results in a discontinuity 61 of the curvature curve 60 at the symmetry plane, which does not fulfill industry requirements.

Figure 7:
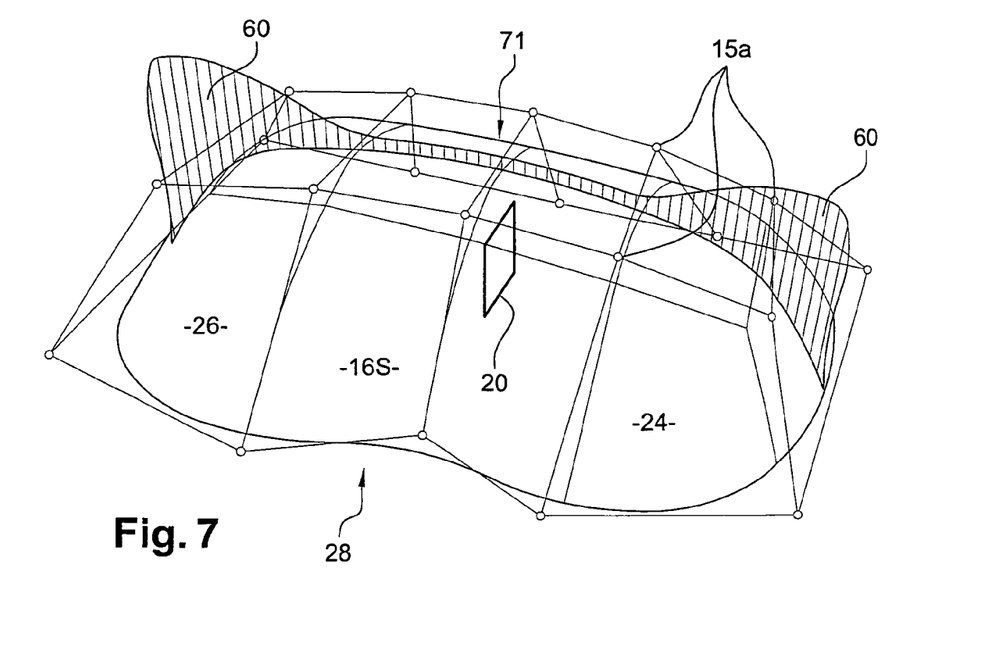
FIG. 7 illustrates the curvature continuity obtained according to the invention, starting from a base mesh pattern similar to that of FIG. 6.

To overcome such drawbacks, the invention proposes the management of both initial and transformed objects in a single subdivision. This enables intrinsic tangency and curvature continuity e.g. at the symmetry plane, as illustrated in FIG. 7.

Figure 8:
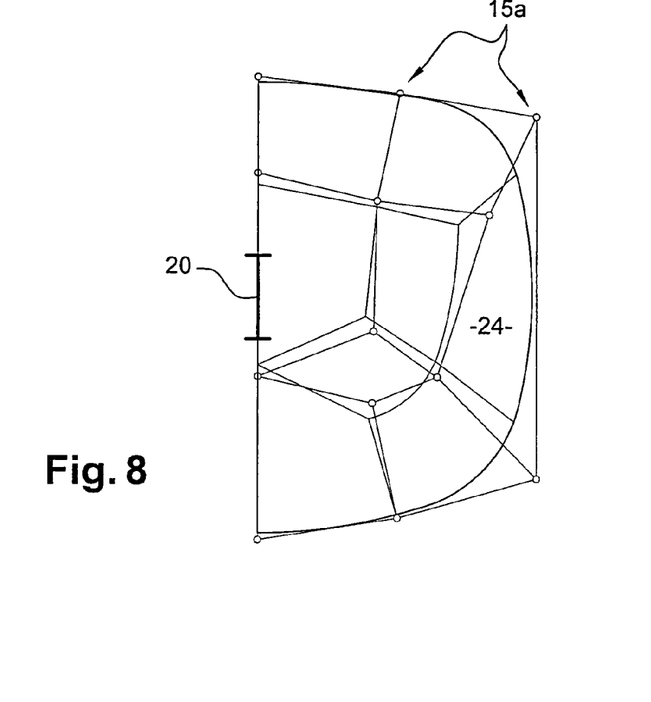
Figure 9:
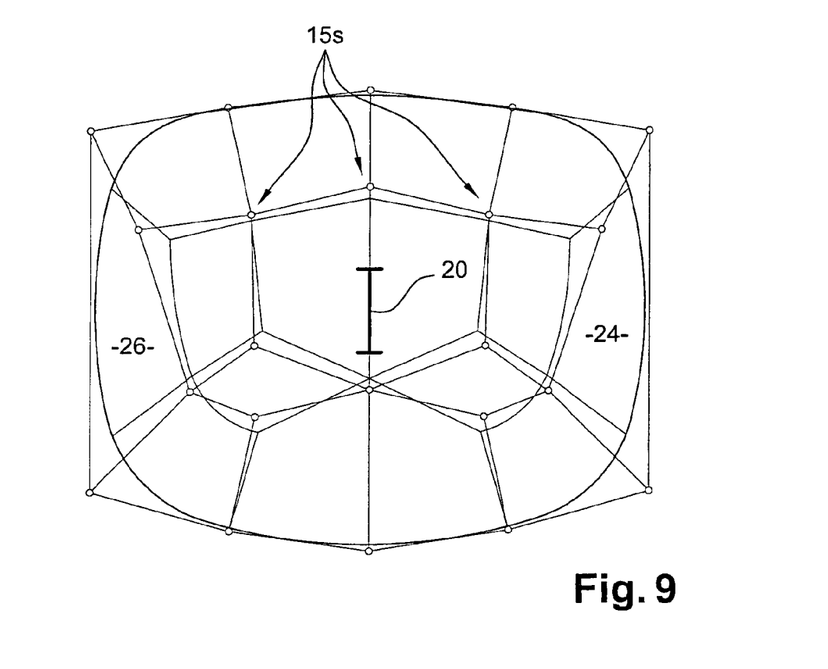
FIG. 9 illustrates curvature continuities occurring at a connection involving a trimmed patch.

More in details, the invention proposes first identifying a mesh pattern 15a ("a" is for asymmetric). Said mesh pattern 15a is not yet subdivided and corresponds to an initial input object (for example shape 24 in FIG. 8-9) to be symmetrized. Then, it is created a base mesh 15s ("s" if for symmetric) from said mesh pattern and according to said symmetry plane 20. The base mesh 15s is transformed so as to be symmetric with respect to said symmetry operation 20. Once the required symmetry has been obtained, the base mesh is subdivided, at a given order, into a subdivided mesh (the subdivided base mesh is not shown, for clarity). Finally, a parametric surface 16s is constructed from elementary faces of the base mesh, as known in the art. Owing to subdivision properties, the above scheme ensures that the continuity normally provided (thanks to the subdivision algorithm) is preserved. In the examples of FIG. 7 or 8-9, the creation of symmetrical shapes 28 using a single subdivision provides curvature continuity 71 at the symmetry plane, which level of continuity is inherent to the subdivision algorithm. Intervention of the user, e.g. after symmetrization, is therefore not required to correct the discontinuity. Note that manual creation of a symmetrical subdivision mesh is anyway difficult to achieve owing to usual mesh complexity.

The steps of the method according to the invention shall now be exemplified in more details in reference to FIGS. 8-13.

In reference to FIG. 8, inputs of the operator are for example:
  positioning the vertices (connected by edges) of the initial mesh pattern;
  specify the symmetry operator (here a symmetrical plane 20); and
  the side of the mesh to be symmetrized (here corresponding to the half shape 24). Preferably, the algorithm requests that input mesh intersects fully or locally the symmetry plane 20 or at least touches it (as is the case in FIG. 8). A perfect matching of the plane 20 onto an end surface of the initial shape 24 (as in the case of FIG. 8) is actually not required.

After user validation of the inputs, outputs are automatically generated, possibly according to user-editable parameters. The output is preferably real-time generated so as to allow for immediate representation of the result. In addition, the last result of a symmetrization may remain displayed in the graphical user interface. Thus, simplicity of management of half a subdivision mesh is not impaired by a lack of depiction of the final shape.

In reference to FIG. 9, a first output of the symmetrization operator is a symmetrized base mesh, whereby subdivision and creation of the parametric surface follow.

In an embodiment, the operator may actually proceed in two steps:
  First, it analyzes the initial mesh pattern 15a of the half shape 24 and slightly rework mesh pattern 15a, if necessary (this will be detailed later);
  Then, it proceeds to symmetrizing said half mesh pattern 15a and joins both sides to produce a single mesh 15s. Once a symmetrized base mesh 15s is obtained, its subdivision into a subdivided mesh follows.

Figure 10:
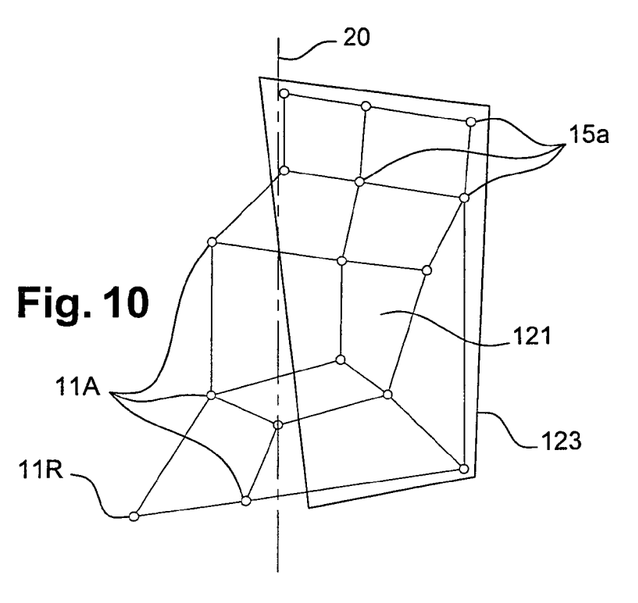
FIGS. 10-11 exemplify a step of modifying some of the vertices of the initial mesh pattern, before symmetrization.
Figure 11:
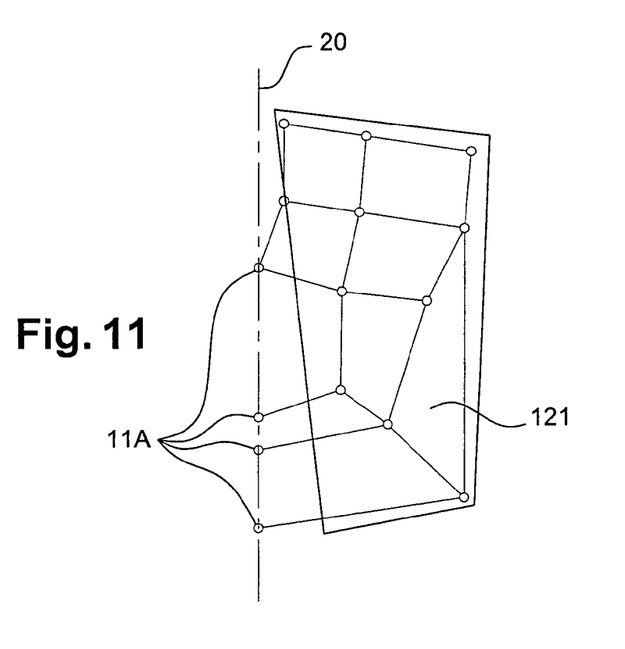
Figure 12:
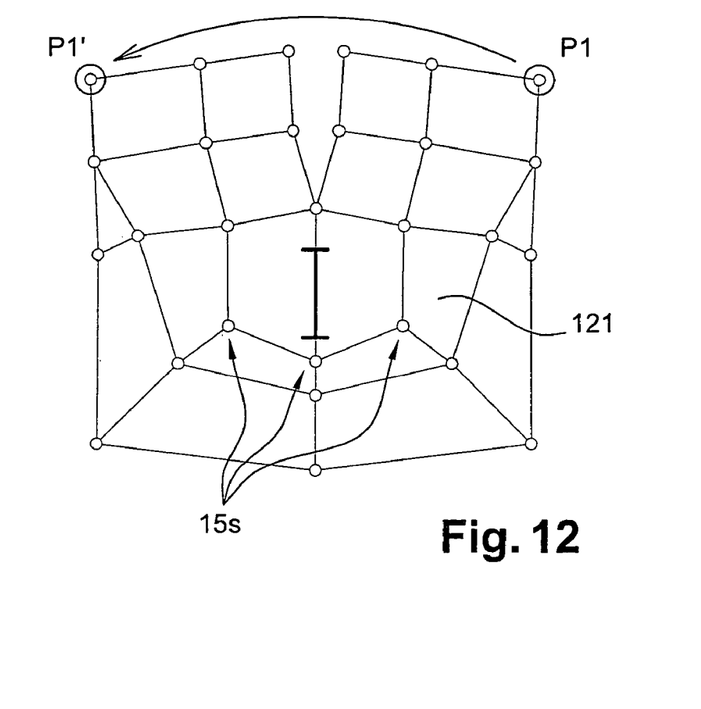
FIG. 12 illustrates symmetrization of the base mesh pattern, after the modification illustrated in FIGS. 10-11.
Figure 13:
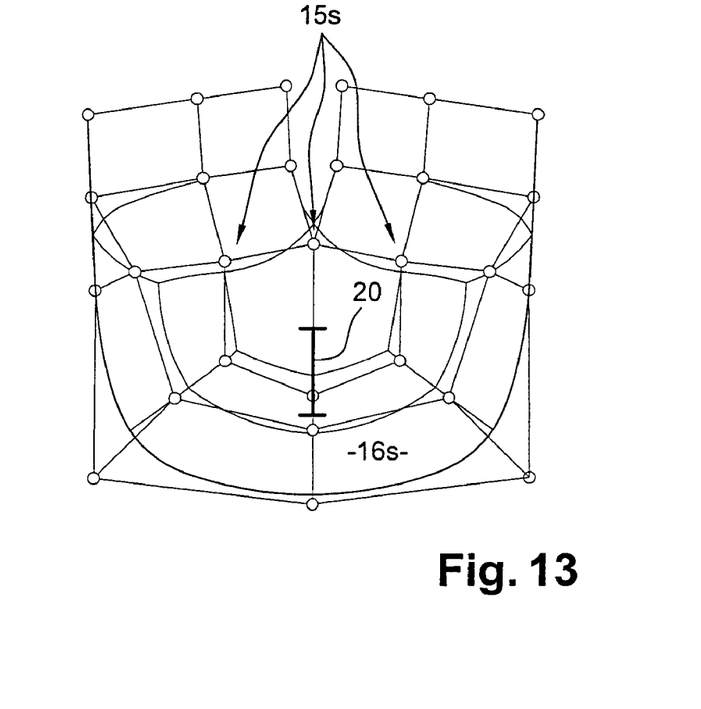
FIG. 13 shows a resulting subdivision surface, fulfilling a G2 continuity requirement.

How the algorithm may modify some of the vertices of the initial mesh pattern, is now explained in reference to FIGS. 10-11.

In reference to FIG. 10: one assumes that a user has validated inputs as discussed above. Here, the user has positioned vertices of the initial mesh pattern 15a, specified the symmetry operator corresponding to plane 20; and the side 121 to symmetrize.

The plane 20 intersects the input mesh 15a. Therefore, some of the vertices (e.g. comprised in area 123 represented for the sake of clarity) clearly belong to the side 121 to symmetrize, while remaining vertices 11A, 11R do not. A proper management of the remaining vertices should hence preferably be implemented.

To this aim, when analyzing the initial mesh pattern 15a, the operator may realize that some of the input vertices 11A, 11R have to be modified (according to how said symmetry plane 20 has been specified by the user). Symmetrizing the input mesh will hence merely rely on unmodified vertices 123.

In fact, modifying some of the vertices appears useful to prevent from obtaining unwanted features in the final shape. In the present case, vertex 11R should preferably be removed, else a non-symmetrical feature remains. Should this vertex by symmetrized by the operator, it would give rise to a mirror vertex (on the side 121) which would slightly modify the desired shape. Accordingly, some of the vertices are preferably discarded or removed.

In addition, some of the input vertices 11A, e.g. vertices close to the plane 20 may preferably be adjusted in position, which also prevent from obtaining unwanted features while giving rise to a symmetrized mesh which is close in spirit to the actual user wish.

In an embodiment, the following scheme may be used, which offer a practical way of choosing vertices to be either discarded or adjusted.

Vertices 123 to be kept are those belonging to a face fully located at the side 121 to symmetrize;

Vertices to be removed are:
Vertices belonging to a face which is fully at the other side of the symmetry plane 20 (not shown here); and
Vertices belonging to a face which has only one vertex at the side 121 to symmetrize. Note that other schemes may be implemented, according to the desired rendering; and Vertices 11A to adjust are the remaining vertex belonging to a face which intersects the symmetry plane 20.

In reference to FIG. 11, vertices to adjust are for instance recomputed to be located onto the symmetry plane 20. To achieve this, a simple method is to project said vertices onto the symmetry plane 20. For example, a direction of a joining edge can be used.

Note that similar rules could be developed in the case of axial symmetry, e.g. vertices could be projected onto the axis, or still in the case of other symmetry operations.

Hence, a mesh is obtained, which is ready for symmetrization. Based on the latter, the last main operation can be made in two steps, which are:
symmetrization of the adjusted mesh (see FIG. 12); and
subdivision of the resulting symmetrized mesh (see FIG. 13).

As regards the symmetrization of the adjusted mesh (in reference to FIG. 12): for each vertex P1 of the adjusted mesh (except vertices located onto the symmetry plane), a mirrored vertex P1' is computed using a basic transformation matrix. A symmetric mesh 15s is thereby obtained.

Then (in reference to FIG. 13), the symmetrized single mesh 15s is used to compute corresponding subdivided mesh and subdivision surface 16s. Said surface 16s has, by definition, the geometrical continuity provided by the subdivision algorithm (for instance G2 continuity at the symmetry plane).

Preferably, faces of the subdivided mesh are converted into respective elementary parametric surfaces or patches. Such a scheme fits the Catmull-Clark algorithm and preserves the topology of the symmetrized mesh. Said elementary parametric surfaces form the parametric surface, having the required symmetry.

The above method and variants are likely to be implemented within a suitable graphical user interface (GUI), together with a CAD software. Said software and GUI are likely to allow for 3D representation the base mesh, possibly subdivided, and elementary parametric surfaces.

A suitable CAD-like interface may be provided with standard menu bars as well as bottom and side toolbars. Such menu- and toolbars may for instance contain a set of user-selectable icons, each icon being associated with one or more operations or functions, as known in the art.

Some of these icons are for instance associated with software tools, adapted for editing and/or working on a modeled product or parts of product. The software tools in question may be grouped into workbenches. Otherwise put, each workbench comprises a different subset of software tools. In particular, one of these can be an editing workbench, suitable for editing geometrical features of the modeled product. In operation, a designer may for example pre-select a part of the product and then initiate an operation (e.g. change the dimension, color, etc.) by selecting an appropriate icon. For example, typical CAD operations are the modeling of the punching or the folding of a 3D modeled object displayed on the screen.

The GUI may for example display data related to the displayed product as a "feature tree", as well as their 3D representation. The GUI may further show various types of graphic tool, for example for facilitating 3D orientation of the object, for triggering a simulation of an operation of an edited product or render various attributes of the displayed product.

Figure 14:
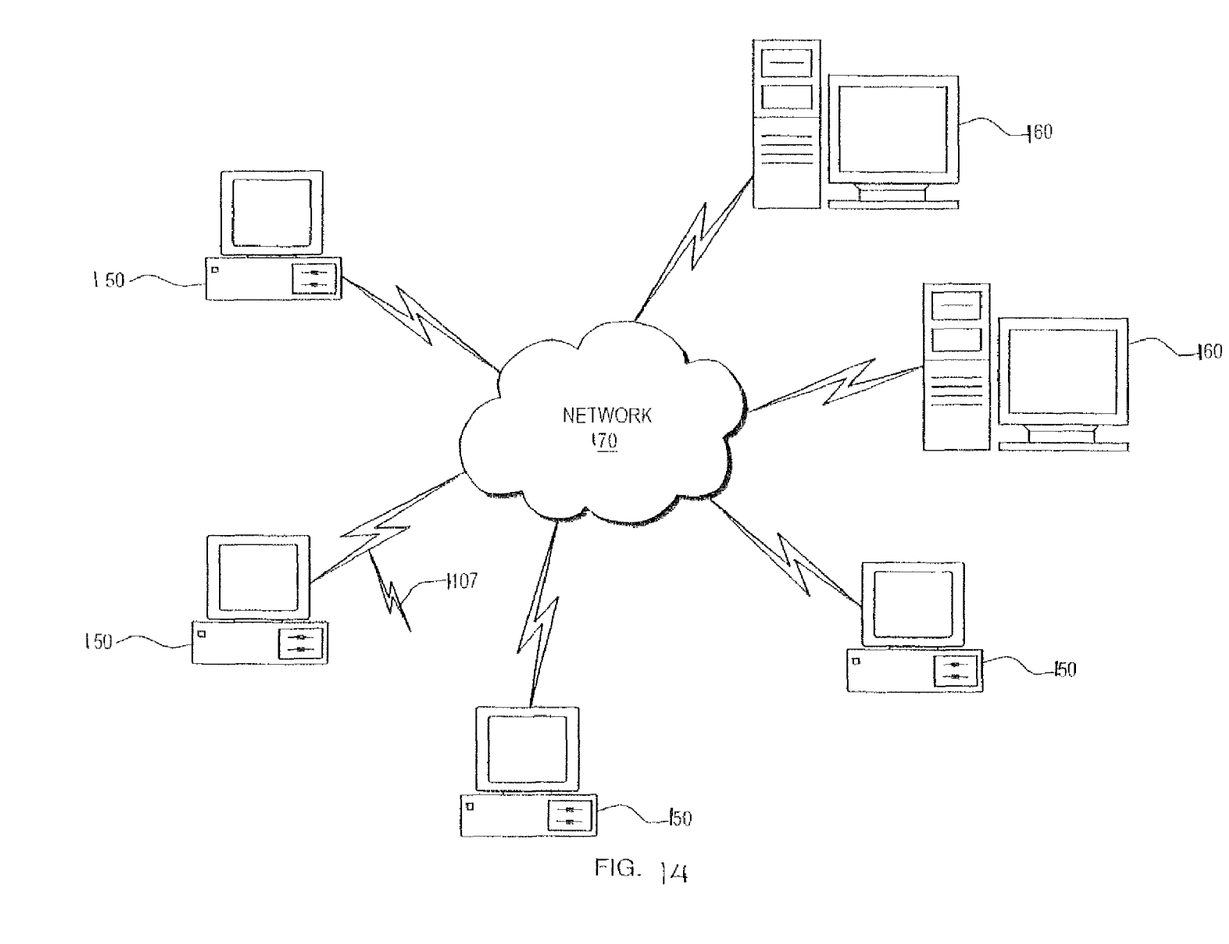
FIG. 14 is an example computer network deploying embodiments of the present invention.
Figure 15:
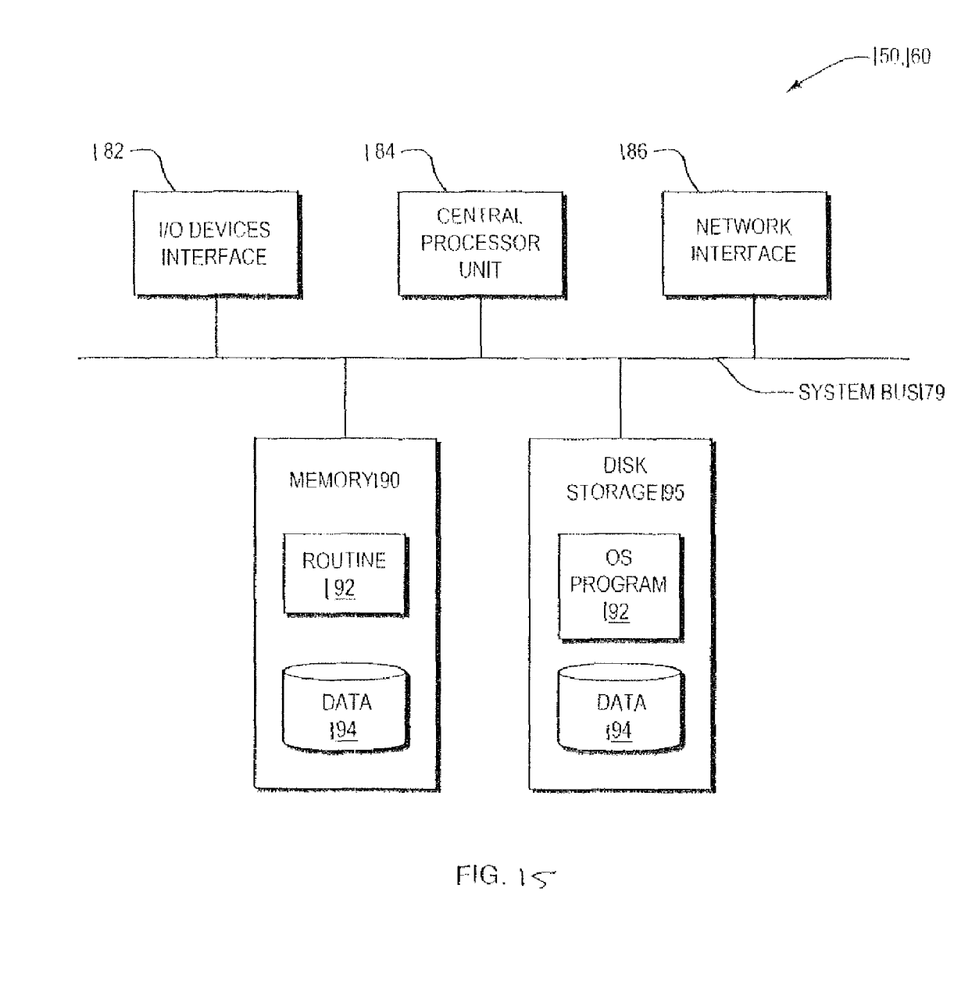
FIG. 15 is an example computer implementing embodiments of the present invention.

As an example of embodiment, the method of the invention is implemented in a computer network comprising user computers and one or more product data management (PDM) system (described in greater detail in reference to FIGS. 14 and 15). The user computers are in communication with the PDM system. The PDM system may for example be located at a backbone of the network. The PDM system allows for the management of numerous documents, relations and data, possibly hierarchically interrelated. Such a PDM system is equipped with a product lifecycle database having data related to modeled products, assemblies and product parts, which are likely to be edited by a designer. A plurality of users may thus work in a collaborative way, on different parts/products/assemblies.

FIG. 14 illustrates a computer network or similar digital processing environment in which embodiments of the present invention may be deployed.

Client computer(s)/devices 150 (e.g., a user computer) and server computer(s) 160 (e.g., a product data management (PDM) system) provide processing, storage (e.g., a product lifecycle database having data related to modeled products, assemblies and product parts, which are likely to be edited by a designer), and input/output devices executing application programs and the like (e.g., managing numerous documents, relations and data, possibly hierarchically interrelated). Client computer(s)/devices 150 can also be linked through communications network 170 to other computing devices, including other client devices/processes 150 and server computer(s) 160.

Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 15 is a block diagram of the internal structure of a computer (e.g., client processor/device 150 or server computers 160 of FIG. 14) in which various embodiments of the present invention may be implemented. Each computer 150, 160 contains system bus 179, where a bus is a set of hardware lines used for data transfer among the components of a computer or processing system. Bus 179 is essentially a shared conduit that connects different elements of a computer system (e.g., processor, disk storage, memory, input/output ports, network ports, etc.) that enables the transfer of information between the elements. Attached to system bus 179 is I/O device interface 182 for connecting various input and output devices (e.g., keyboard, mouse, displays, printers, speakers, etc.) to the computer 150, 160. Network interface 186 allows the computer to connect to various other devices attached to a network (e.g., network 170 of FIG. 14). Memory 190 provides volatile storage for computer software instructions 192 and data 194 used to implement an embodiment of the present invention. Disk storage 195 provides non-volatile storage for computer software instructions 192 and data 194 used to implement an embodiment of the present invention. Central processor unit 184 is also attached to system bus 179 and provides: for the execution of computer instructions.

In one embodiment, the processor routines 192 and data 194 are a computer program product (generally referenced 192), including a computer readable medium (e.g., a removable storage medium such as one or more DVD-ROM's, CD-ROM's, diskettes, tapes, etc.) that provides at least a portion of the software instructions for the invention system. Computer program product 192 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 192 is a propagation medium that the computer system 150 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 14 and 15 are for purposes of illustration and not limitation of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for modeling a part or an assembly of parts with a product data management system by creating a parametric surface symmetric with respect to a given symmetry operation (20), comprising the following ordered steps of:
   in a processor
   identifying a mesh pattern (15a) that corresponds to an initial input object to be symmetrized according to said symmetry operation; then
   creating a base mesh (15s) from the mesh pattern, by automatic symmetrization according to said symmetry operation, said base mesh being symmetric with respect to said symmetry operation; then
   subdividing the base mesh at a given order into a subdivided base mesh defining elementary faces; and then
   forming the parametric surface (16s) from the elementary faces of the subdivided base mesh according to said elementary faces.

2. The method accordingly to claim 1, wherein the mesh pattern has a plurality of vertices, the step of creating further comprising:
   modifying a portion of the plurality of vertices (11A, 11R) of the mesh pattern, according to said symmetry operation; and
   obtaining the base mesh (15s) according to said symmetry operation and unmodified vertices of the mesh pattern, so as to form the base mesh.

3. The method according to claim 2, wherein, at the modifying step, one or more vertices are discarded.

4. The method according to claim 2, wherein, at the modifying step, one or more vertices are discarded (11R) and other vertices are adjusted (11A) in position.

5. The method according to claim 4, wherein:
   said symmetry operation is a reflection symmetry with respect to a plane (20); and
   said plurality of vertices are connected by edges defining pattern faces, said plane intersecting some of the pattern faces.

6. The method according to claim 5, wherein:
   the unmodified vertices belong to pattern faces (123) fully located on one side of the plane; and
   the discarded vertices (11R) belong to pattern faces fully located on the other side of the plane.

7. The method according to claim 3, wherein, at the creating step includes:
   creating the base mesh to have a reflection symmetry with respect to a plane; and
   connecting the plurality of vertices with edges to define pattern faces, the plane being intersected by some of the pattern faces.

8. The method according to claim 7, wherein at the modifying step includes:
   locating the unmodified vertices on one side of the plane, the located unmodified vertices belonging to pattern faces (123) located on the one side of the plane; and
   locating the discarded vertices (11R) on the other side of the plane; the located discarded vertices belonging to pattern faces located on the other side of the plane.

9. The method according to claim 1, wherein the subdivided base mesh has a plurality of vertices connected by edges defining faces, the method further comprising, at the step of forming, a step of:
   converting faces of the subdivided base mesh into respective elementary parametric surfaces, said elementary parametric surfaces forming the parametric surface (16s).

10. The method according to claim 9, wherein the parametric surface is formed so as to have a required geometrical continuity Gi.

11. The method according to claim 10, wherein the base mesh is subdivided according to Catmull-Clark subdivision rules.

12. The method according to claim 1, further comprising, a step of providing a graphical user interface adapted for:
   displaying said mesh pattern, a representation of said symmetry operation and the parametric surface.

13. The method according to claim 12, wherein said mesh pattern, representation of said symmetry operation and the parametric surface are displayed in 3D.

14. The method according to claim 1, further comprising:
   receiving a user modification of the mesh pattern or the symmetry operation, wherein:
   said steps of creating, subdividing and forming are real-time performed.

15. The method according to claim 1, further comprising:
   receiving a user modification of the mesh pattern or the symmetry operation; and
   creating the base mesh, subdividing the base mesh to define the elementary faces, and forming the parametric surfaces from the elementary faces substantially in real-time, in response to the user modification of the mesh pattern or the symmetry operation.

16. A computer program product for modeling a part or an assembly of part with a product data management system by creating a parametric surface symmetric with respect to a given symmetry operation (20), the computer program product comprising:
   a nontransitory computer readable medium having a computer readable program, wherein the computer readable program when executed on a computer causes the computer to:
   identify a mesh pattern (15a) that corresponds to an initial input object to be symmetrized according to said symmetry operation;
   create a base mesh (15s) from the mesh pattern by automatic symmetrization according to a symmetry operation, said base mesh being symmetric with respect to said symmetry operation;
   subdivide the base mesh, at a given order, into a subdivided base mesh defining elementary faces; and
   form a parametric surface (16s) from the elementary faces of the subdivided base mesh according to said faces.

17. The computer program product of claim 16 wherein the subdivided base mesh has a plurality of vertices connected by edges defining faces; and
   the computer readable program further comprising program code to convert faces of the subdivided base mesh into respective elementary parametric surfaces, the elementary parametric surfaces forming the parametric surface (16s) with a geometrical continuity Gi.

18. A computer system for modeling a part or an assembly of part with a product data management system by making a parametric surface symmetric with respect to a given symmetry operation (20) comprising:
   means for identifying a mesh pattern (15a) that corresponds to an initial input object to be symmetrized according to said symmetry operation;
   means for creating a base mesh (15s) from the mesh pattern, by automatic symmetrization according to a symmetry operation, said base mesh being symmetric with respect to said symmetry operation;
   means for subdividing the base mesh, at a given order, into a subdivided base mesh defining elementary faces; and
   means forming a parametric surface (16s) from the elementary faces of the subdivided base mesh according to said faces.

19. A computer system as claimed in claim 18 wherein the subdivided base mesh has a plurality of vertices connected by edges defining faces; and
   the means for forming further converts faces of the subdivided base mesh into respective elementary parametric surfaces, the elementary parametric surfaces forming the parametric surface (16s).

20. A computer system as claimed in claim 18 further comprising a graphical user interface configured for displaying said mesh pattern, a representation of the symmetry operation and the parametric surface.

* * * * *

UNITED STATES PATENT AND TRADEMARK OFFICE
CERTIFICATE OF CORRECTION

| | | |
|---|---|---|
| PATENT NO. | : 7,893,937 B2 | Page 1 of 1 |
| APPLICATION NO. | : 11/780822 | |
| DATED | : February 22, 2011 | |
| INVENTOR(S) | : Sébastien Rosel et al. | |

It is certified that error appears in the above-identified patent and that said Letters Patent is hereby corrected as shown below:

Title page, item [75] "Inventors", delete "Jean-Mare Chauvet" and insert --Jean-Marc Chauvet--.

Signed and Sealed this
Fifth Day of April, 2011

David J. Kappos
*Director of the United States Patent and Trademark Office*